Jan. 6, 1931.   R. A. STOKES ET AL   1,788,351
APPARATUS FOR THE HEAT TREATMENT OF METALLIFEROUS MATERIALS
Filed March 5, 1930
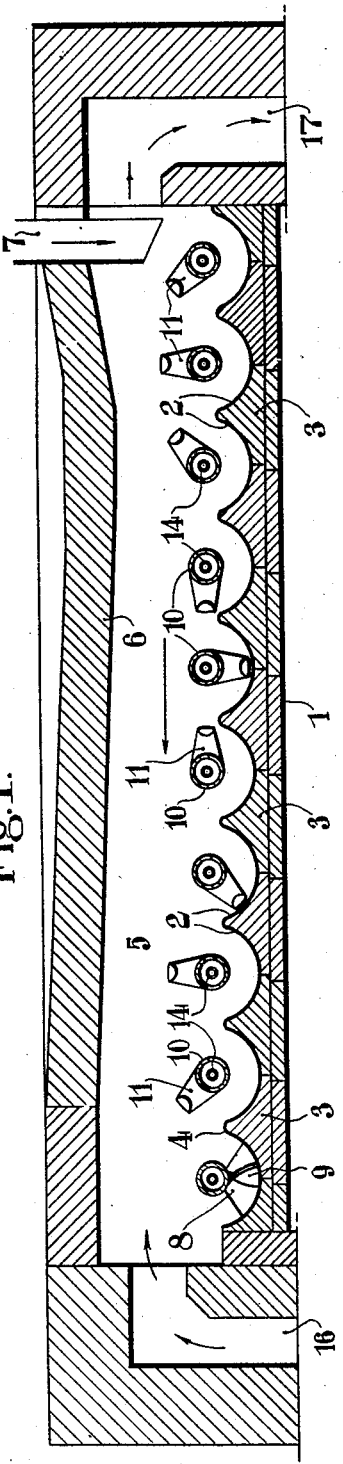
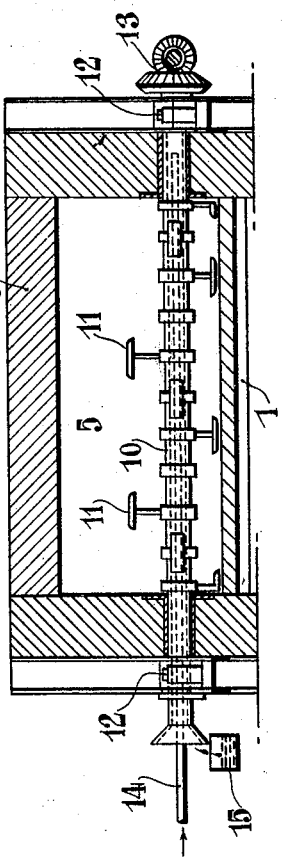

Patented Jan. 6, 1931

1,788,351

UNITED STATES PATENT OFFICE

RICHARD ALBERT STOKES AND EDWIN GILBERT LLEWELLYN ROBERTS, OF LONDON, ENGLAND, ASSIGNORS TO E. M. S. INDUSTRIAL PROCESSES, LIMITED, OF LONDON, ENGLAND

APPARATUS FOR THE HEAT TREATMENT OF METALLIFEROUS MATERIALS

Application filed March 5, 1930, Serial No. 433,424, and in Great Britain December 20, 1928.

We have found that the apparatus described in the specification of Letters Patent No. Re. 17,251 and application for Letters Patent Serial No. 159,401, for use as a retort for the low temperature carbonization of coal, can be adapted for the heat treatment of metalliferous materials.

The primary object of the present invention is to provide an improved and modified apparatus, capable of treating cheaply a large bulk of metalliferous material, with a minimum degree of supervision, and in a highly efficient manner.

The present invention consists in apparatus for the heat treatment of metalliferous material, comprising a solid bed having its upper surface in the form of a series of troughs or depressions of arcuate cross-section over which the material is adapted to be passed, and to be stirred, agitated, or mixed during its passage by means of a plurality of stirrers or agitators individual to each trough.

Other features of the invention will be apparent from the following description.

In the accompanying drawing:—

Fig. 1 shows diagrammatically a longitudinal section of a suitable apparatus, and Fig. 2 is a transverse section of the form of apparatus shown in Fig. 1.

Referring to the drawings:—

The apparatus comprises a solid bed 1 of fireclay or other refractory material, having its upper surface in the form of a series of troughs or depressions 2 of arcuate cross-section.

In the particular construction shown the bed of the apparatus is formed of a plurality of refractory blocks 3, whereby a damaged portion of the bed may be readily removed and various structural alterations may, when necessary, be more conveniently made. The refractory troughs are also shown provided with a floor or lining 4 of suitable metal, although it will be understood that in some cases the metal lining may be dispensed with.

This solid bed 1 forms the floor of a chamber 5, the upper part 6 of which is formed as shown, the said chamber being provided near one end thereof with an inlet 7 for the material to be treated and an outlet 8 in the end walls of the last trough of the series from which the treated material is expelled by the action of the conveyor 9.

Each of the troughs is provided with a shaft 10 upon which are mounted a plurality of paddles, stirrers, or agitators 11 which serve to agitate and mix the material during its passage over the troughs. The shafts 10 are hollow and are rotatably mounted on bearings 12 external to the casing 5 and are driven by bevel gears 13 mounted upon a suitable shaft. Cooling or heating medium is adapted to be fed by means of the pipe 14 to that end of the hollow shaft 10 adjacent the bevel wheel 13 and to be returned along the annular space between the pipe 14 and the inner surface of the hollow shaft 10 to a convenient receptacle 15. The hollow shafts 10 may when necessary or desirable be replaced by solid shafts.

The material under treatment is adapted to be fed through the inlet 7, and after passing over the troughs by the action of the paddles or stirrers, is finally passed out to the lateral opening 8 by the operation of the screw conveyor 9 mounted in the last trough of the series. The hot gases forming the heating medium for the material are passed thereover in a direction opposed to the movement of the material through the apparatus and in direct contact therewith, the hot gases entering by the passage 16 and passing out through the passage 17. In this manner the materials are subjected to a gradually increasing temperature.

In some cases the heating means shown may be supplemented or replaced by heating means provided beneath the bed of the retort.

In order to ensure that the apparatus works at its greatest efficiency, the material in the trough should preferably be above the level of the shafts carrying the paddles or stirrers.

While the material to be treated has been described as coming into direct contact with the hot gases forming the heating means, it will be understood that the heat may be applied to the material indirectly and that the heating medium may be produced from a coal fire, pulverized fuel flame, gas or oil flame, or it may be heated electrically, while in the case of materials containing sulphur, the heat for increasing the temperature of such material is generated by the combustion of the sulphur contained in the material, no further heating medium being necessary.

By the introduction into the first trough or depression of the material to be treated, such material is increased in temperature and in the case where material is to be treated by a reagent, intimate mixing occurs, and the desired chemical reactions take place.

The action of the paddles, stirrers, agitators or conveyors is three-fold; it allows of the material being brought into intimate and constantly renewed contact with the heating medium; it assists in the conveying of the material from one trough or depression to another, and it also prevents the material from caking and in some cases renders it down into a finely divided state.

What we claim and desire to secure by Letters Patent is:—

1. In an apparatus for the heat treatment of metalliferous material, the combination of a solid bed having its upper surface in the form of a series of troughs or depressions, over which the material is adapted to be passed in a transverse direction, and means individual to each trough for stirring and mixing the material in said trough and assisting in feeding to the next trough in the series material in excess of the capacity of the trough.

2. In an apparatus for the heat treatment of metalliferous material, the combination of a solid bed having its upper surface in the form of a series of troughs or depressions, over which the material is adapted to be passed in a transverse direction, a metal cover for the upper surface of each of the said troughs, and means individual to each trough for stirring and mixing the material in said trough and assisting in feeding to the next trough in the series material in excess of the capacity of the trough.

In testimony whereof we affix our signatures.

RICHARD A. STOKES.
EDWIN G. L. ROBERTS.